United States Patent [19]
Rose et al.

[11] Patent Number: 5,220,268
[45] Date of Patent: Jun. 15, 1993

[54] BATTERY CHARGING SYSTEM AND CONNECTION APPARATUS THEREFORE

[75] Inventors: Stephen D. Rose, Irvine; James R. Barker, Winchester; Eldon R. Conley, Lexington; Raymond D. Cooper, Irvine, all of Ky.

[73] Assignee: Premier Engineered Products Corporation, Winchester, Ky.

[21] Appl. No.: 715,331

[22] Filed: Jun. 14, 1991

[51] Int. Cl.[5] .................... H02J 7/00; H01M 10/46
[52] U.S. Cl. .................................. 320/2; 320/56
[58] Field of Search .............. 320/2, 56; 200/50 B, 200/51.09

[56] References Cited

U.S. PATENT DOCUMENTS

| | | | |
|---|---|---|---|
| 3,257,599 | 6/1966 | Somers et al. | 320/2 |
| 3,270,267 | 8/1966 | Nolte, Jr. | 200/51.09 X |
| 3,317,810 | 5/1967 | Inoue | 320/56 |
| 3,801,757 | 4/1974 | Carissimi et al. | 200/50 B |
| 3,898,547 | 8/1975 | Poole | 320/2 |
| 3,904,947 | 9/1975 | Crews | 320/56 X |
| 4,146,825 | 3/1979 | Harhay | 320/23 |

Primary Examiner—R. J. Hickey
Attorney, Agent, or Firm—King & Schickli

[57] ABSTRACT

An apparatus for connecting a battery charger to an electric vehicle including a battery and a drive motor in an electrical circuit includes first and second cooperating connectors. The connectors are adapted for mating in electrical contact. A bracket is provided for mounting the first connector to the vehicle. The second connector is mounted on the distal end of cables leading from the battery charger. The apparatus also includes a switch for interrupting the electrical circuit between the battery and the drive motor prior to mating of the first and second connectors. The invention also relates to a battery charging system incorporating a battery charger, a charger receptacle mounted on the vehicle and a plug for operatively connecting the battery charger to the charger receptacle. Both the charger receptacle and the plug include cooperating electrical contacts. A door is pivotally mounted over the charger receptacle for covering the electrical contacts of the receptacle when not in mating electrical contact with the electrical contacts of the plug. The battery charging system also includes a switch for interrupting the electrical circuit between the battery and the drive motor of the vehicle prior to mating of the plug and receptacle.

20 Claims, 3 Drawing Sheets

BATTERY CHARGING SYSTEM AND CONNECTION APPARATUS THEREFORE

TECHNICAL FIELD

The present invention relates generally to an electrical connection apparatus as well as to a battery charging system adapted, respectively, for connecting to an electrically powered vehicle and for recharging the batteries of the vehicle.

BACKGROUND OF THE INVENTION

Improvements in battery design and electric drive system technology have led to a significant increase in the number of applications for electric vehicles and also the quantity of electric vehicles in use in the world today. For example, in industrial settings, electric vehicles including electrically powered forklift trucks and electrically powered mining vehicles such as shuttle cars are prevalent. In recreational settings, electrically powered golf carts have essentially become the standard for this industry.

It is anticipated that future technological advances will act in conjunction with the needs to conserve energy resources and reduce pollution and lead to the development of electrically powered vehicles for use as commuter transportation.

Virtually all of the electrically powered vehicles of the type described rely upon energy stored in batteries to power their operation. With the exception of certain solar powered vehicles, the batteries are connected by flexible electrical cables and cooperating electrical connectors to charging systems when the vehicles are not in use. These charging systems are designed to bring the batteries to "full charge" so that all possible energy is available to the operator when the vehicles are returned to operation.

In most prior art electric vehicle charging systems, it is possible to drive the vehicle while still connected to the battery charger. This unfortunately represents a significant hazard as the vehicle connector for the battery charger may be jerked from the vehicle charger receptacle and the charger receptacle, connector and/or cables may be damaged. It is also possible for the battery charger unit to be jerked from its place of rest and damaged, for example, as a result of a fall from a shelf. Of course, physical injury could also result from such an incident taking place.

From a safety standpoint, it is therefore quite desirable to have a vehicle battery charging system that prevents the vehicle from being operated while connected to the charging system. This desire has been recognized and was previously addressed in the art as is made evident from a review of U.S. Pat. No. 3,898,547 to Poole. The Poole patent relates to an electric vehicle battery charger interlock system that prevents the vehicle from being driven while the batteries are being charged. More particularly, when the plug at the end of the charger cables is engaged in the charger receptacle on the vehicle, a series circuit is completed through a relay that energizes a coil. The relay disconnects the vehicle speed control solenoid circuit from the battery therefore making the vehicle inoperative.

While the interlock system disclosed in the Poole patent does operate to prevent operation of the drive motor during the charging operation, it must be appreciated that the system is relatively complex and cumbersome. It is both expensive to produce and maintain. The dependability of relay systems in the operating environment of these vehicles is also always a concern.

Recognizing these and other shortcomings a new charger receptacle was subsequently developed for an electric vehicle. This receptacle, as presently incorporated on many Yamaha golf carts, utilizes a microswitch that operates to interrupt the circuit to the drive motor when the charging system is connected to the vehicle. The microswitch is activated by means of an outwardly projecting push button situated between the female contacts of the charger receptacle. More particularly, when fully inserted into the receptacle, the face of the charger plug engages the push button actuator thereby interrupting the circuit between the battery and drive motor of the vehicle.

While substantially reducing the cost of production and maintenance over the Poole interlock system design, this system also suffers from various shortcomings. The main shortcoming has to do with the failure of the system to ensure interruption of the circuit to the vehicle drive motor when connection is made with the battery charger.

More particularly, it is possible for the male contacts of the charger plug to be inserted sufficiently into the female contacts of the charger receptacle to provide connection for charging without the charger plug being sufficiently inserted into the receptacle to engage the actuator button and trip the microswitch. In fact, such a condition usually persists with this arrangement as it is often difficult to insert the charger plug fully into the charger receptacle. This is particularly true after the system has been used for some time as the prong contacts of the charger plug tend to become bent and damaged even when ordinary care is exercised.

When this fact is considered in light of the quick pace in which individuals are usually making this connection, it is clear that this system often fails to provide its desired function. As a result, in the haste to place an electric vehicle in operation, vehicles incorporating this system are often operated with the charger plug connected. This results in the charger plug being jerked from the charger receptacle on the vehicle. Consequently, the plug or cables and even the receptacle may be damaged, requiring down time for maintenance. Additionally, an operator may be injured by the snapping motion of the plug or cables as the plug pops free of the receptacle.

It should therefore be appreciated that a need exists for an improved electrical connection apparatus between an electric vehicle and battery charger.

SUMMARY OF THE INVENTION

Accordingly, it is a primary object of the present invention to provide an electrical connection apparatus for an electric powered vehicle and battery charger overcoming the above-described limitations and disadvantages of the prior art.

Another object of the present invention is to provide an electrical connection apparatus for an electric power vehicle and battery charger of relatively simple, compact construction.

Still another object of the present invention is to provide a battery charging system for an electric vehicle that is relatively inexpensive to produce and that provides high reliability over a longer service life so as to reduce maintenance costs.

Still another object of the present invention is to provide a battery charging system including an electrical connection apparatus incorporating a unique handle so as to be more easily manipulated for improved operator convenience.

Still another object of the present invention is to provide an electrical connection apparatus for an electrically powered vehicle and battery charger incorporating an integral cable clamp block. This clamp block improves the durability of the product by preventing damage to the solder connection between the cable connectors and plug contacts when the cables are grasped and pulled as is often done when disconnecting the battery charger from the vehicle.

An additional object of the invention is to provide a charging system and an electrical connection apparatus for the charging system including a spring loaded door on the charger receptacle on a vehicle. The door is biased into a closed position to cover the contacts thereby significantly reducing the risk of any inadvertent electrical connection being made resulting in an electrical shock.

Still another object of the invention is to provide a battery charging system for an electrically powered vehicle including an interrupt switch that disconnects the drive motor from the electrical circuit of the vehicle prior to making the connection for battery charging. This serves to prevent damage that may result if the vehicle is driven away while the connection is in place. Such possible damage includes broken connectors, cables and charger units.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus is provided for connecting a battery charger to a vehicle including a battery and a drive motor in an electrical circuit. The apparatus includes a first connector or charger plug receptacle and a cooperating second connector or charger plug for mating electrical contact with the receptacle. A bracket is also provided for mounting the receptacle onto the vehicle.

Additionally, the apparatus includes means, such as a microswitch, for interrupting the electrical circuit between the battery and the drive motor of the vehicle. Advantageously, this is done prior to the mating of the charger plug and receptacle so as to avoid a number of significant safety hazards. More particularly, the interruption assures that it is not possible to operate the vehicle while it is connected to the battery charger unit. Accordingly, the charger receptacle, charger plug and charger cables are protected from damage that could occur if the vehicle were operated. Similarly, the possibility of jerking the charger unit from its place of rest and damaging the unit through operation of the vehicle is essentially eliminated. Of course, physical injury that could result from such an incident or, for example, the snapping motion of the cables as the plug pops free from the receptacle is also avoided.

More specifically, the circuit interrupting means includes an actuator, in the form of a trip lever, for intercepting and engaging the charger plug prior to its insertion into the charger plug receptacle in order to make electrical contact. More particularly, the charger plug includes a non-electrically conductive trip member or leading edge. This leading edge extends outwardly beyond the electrical contacts of the plug so as to engage the trip lever before mating electrical contact is made with the charger plug receptacle.

In accordance with yet another aspect of the present invention, cooperating guides are provided on the charger plug and receptacle that serve to align the contacts of these two components for mating as well as align the trip member on the charger plug with the trip lever on the receptacle. Advantageously, the guides ensure smooth connecting action and proper engagement for interruption of the electrical circuit between the battery and drive motor of the vehicle.

In accordance with the further aspect of this invention, the electrical connection apparatus further includes a door for covering the charger receptacle when it is not in mating electrical contact with the charger plug. More particularly, the door is pivotally mounted to the mounting bracket by means of hinges. The door further includes a spring arrangement for biasing the door to a closed position. By covering the contacts of the female receptacle, the spring loaded door significantly reduces the risk of any inadvertent electrical connection being made with the electrical circuit of the vehicle. Accordingly, the shock hazard is significantly reduced.

In accordance with yet another aspect of the present invention, the electrical connection apparatus includes a handle on the charger plug. The handle is substantially J-shaped to aid in the manipulation of the charger plug during connection and disconnection from the charger plug receptacle. A block is also provided for securing the charger cables to the handle. More particularly, the block includes a pair of grooves into which the electrical cables, leading from the charger, are received. Means are also provided for fastening the block to the handle so as to tightly pinch the cables held in the grooves. Accordingly, when an individual improperly attempts to remove the charger plug from the receptacle by pulling the cables, the pulling forces are applied to the point where the cables are pinched between the block and the handle rather than to the solder connection between the cables and the contacts of the charger plug. Hence, the integrity of the solder connection is maintained and the reliability of the apparatus is significantly enhanced.

In accordance with still another aspect of the present invention, a battery charging system is provided for an electric vehicle including a battery and drive motor in an electrical circuit. The battery charging system includes all the components of the electrical connection apparatus described above in combination with a battery charging means. An example of such a charging means is the TURBO-Z battery charger manufactured by Pepco, Inc. of Winchester, Ky. This battery charger apparatus and the associated method is disclosed in U.S. Pat. No. 4,740,739, the disclosure of which is fully incorporated herein by reference. Of course, the battery charging system includes all the features and provides all the advantages described above with respect to the electrical connection apparatus.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of this specification, illustrates several aspects of the present invention, and together with the description serves to explain the principles of the invention. In the drawing:

FIG. 3 is a view similar to FIGS. 1 and 2 showing the charger plug and charger plug receptacle fully mated to allow commencement of the charging operation;

Reference will now be made in detail to the present preferred embodiment of the invention, an example of which is illustrated in the accompanying drawing.

DETAILED DESCRIPTION OF THE INVENTION

The apparatus 10 of the present invention for connecting a battery charger to a vehicle will now be described with reference to drawing FIGS. 1-5. Drawing FIG. 6 shows the electrical circuit for the battery charging system 100 of the present invention. Both the electrical apparatus 10 and battery charging system 100 will be described with reference to an electrically powered golf cart. It should be appreciated, however, that the golf cart is merely an example of one type of an electrically powered vehicle to which the invention has application. Accordingly, the invention should not be considered as limited thereto.

Figures 1, 2:
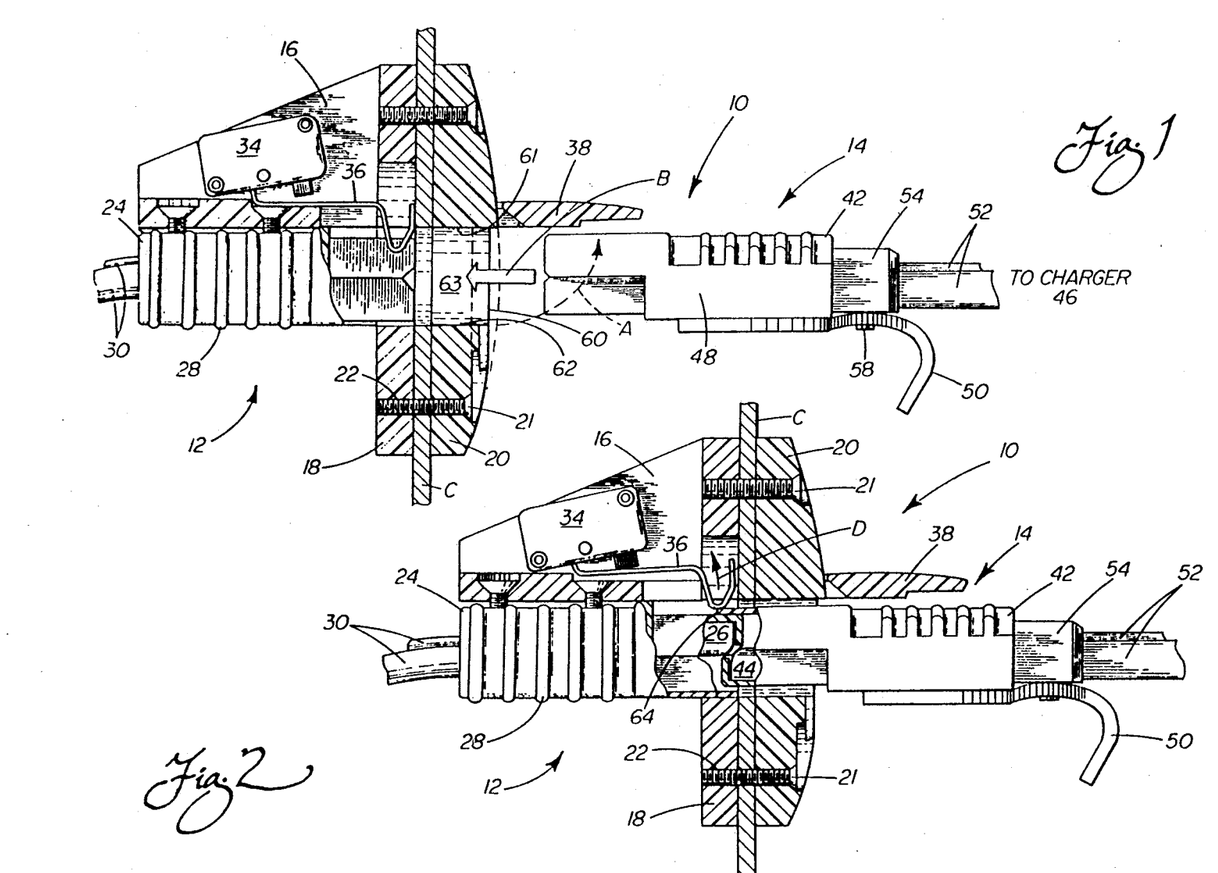
FIG. 1 is a partially sectional side elevational view showing the apparatus of the present invention as the charger plug is inserted into the charger plug receptacle.
FIG. 2 is a view similar to FIG. 1 showing the tripping of the microswitch that interrupts the circuit between the vehicle battery and drive motor prior to mating connection of the charger plug and charger plug receptacle.

As shown in FIG. 1, the electrical connection apparatus 10 includes a first connector or charge plug receptacle 12 and a cooperating second connector or charger plug 14. The charger plug 14 is adapted for mating in electrical contact with the receptacle 12. The receptacle 12 includes a mounting bracket 16 having an integral backing plate 18 and a cooperating face plate 20. The bracket 16 is mounted to a body panel or cowling C of the vehicle by sandwiching the cowling between the backing plate 18 and face plate 20. Four screws are then extended through aligned apertures in the face plate 20 and cowling C and tightened in aligned threaded holes 22 in the backing plate 18.

Preferably, the bracket 16, including the backing plate 18 and face plate 20, is formed from a non-electrically conductive and heat resistant material. For example, the bracket 16 may be injection molded from a thermal plastic resin such as NORYL N-190 or N-300. CYCOLAC plastic resin could also be utilized.

An electrical connector 24 is mounted to the bracket 16 by means of screws 26. The connector 24 includes a pair of electrical contacts 26 (only one shown in FIG. 2) held, for example, within a sleeve of non-electrically conductive, fire-resistant material such as ABS plastic that is twenty percent (20%) glass filled for strength. The contacts 26 are connected to positive and negative battery leads 30 that are operably connected at their opposite ends to the terminals of the vehicle battery 32.

A microswitch 34 is also mounted to the bracket 16 by means of screws (not shown). The microswitch 34 includes an actuator, in the form of a trip lever 36. The trip lever 36 includes a hook-shaped distal end adapted to engage a non-conductive portion of the charger plug 14 prior to the charger plug 14 mating with the charger plug receptacle 12 in a manner described in greater detail below. The entire trip lever 36 is recessed behind the face plate 20 and does not extend beyond the backing plate 18 so as to effectively prevent inadvertent contact and disruption of the drive circuit.

Figure 4:
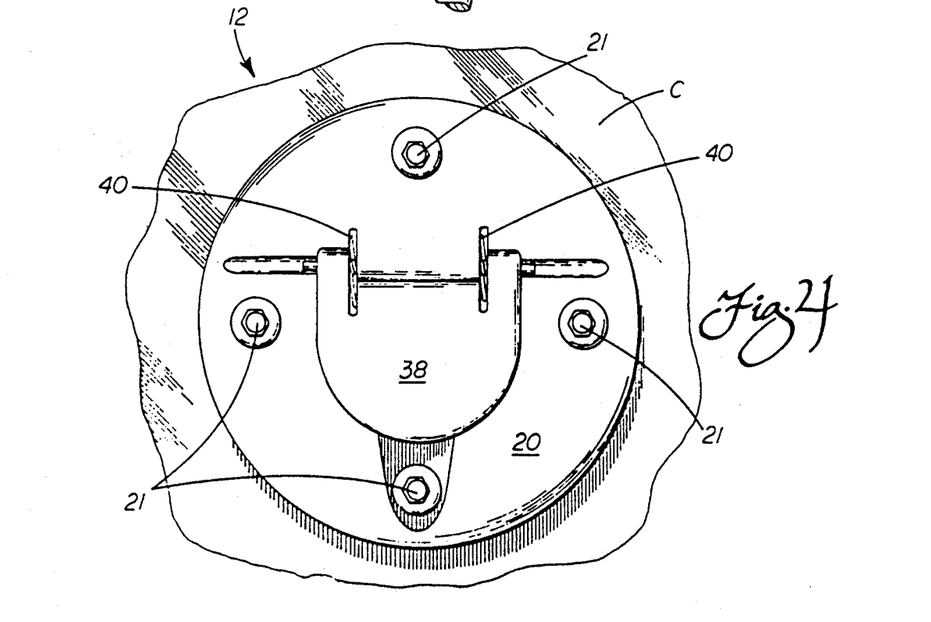
FIG. 4 is a front elevational view of the charger plug receptacle showing the safety door in the closed position.

As a further safety feature, the face plate 20 of the receptacle 12 has a safety door 38 pivotally mounted thereto. As shown in FIG. 4, the safety door 38 is biased by means of a pair of coiled springs 40 into a closed position covering the connector 24. Accordingly, inadvertent contact with the conductors 26 held in the connector 24 is essentially prevented. This substantially reduces any shock hazard. Of course, it should also be noted that the door 38 covers and protects the microswitch 34 and the recessed trip lever 36. Accordingly, further protection is provided against inadvertent contact with the trip lever 36 and the resulting interruption of the vehicle drive circuit.

This is a significant problem in prior art connector designs incorporating projecting actuators. This is true even where those actuators are covered by safety doors as the doors must also project. Due to the lightweight materials utilized in construction, the projecting doors are often impact damaged and when misaligned actually engage the projecting actuator and interrupt the drive circuit. Conversely, when the door is broken from the connector, the projecting actuator button is fully exposed for inadvertent contact and drive circuit interruption when vehicle operation is desired.

When it is necessary to connect the charger plug 14 into the receptacle 12, the door 38 is pivoted from the closed position shown in FIG. 4 and in dash line in FIG. 1 to the open position shown in full line in FIG. 1 (note action arrow A). The connection between the charger plug 14 and the receptacle 12 may then be made as desired.

Figure 5:
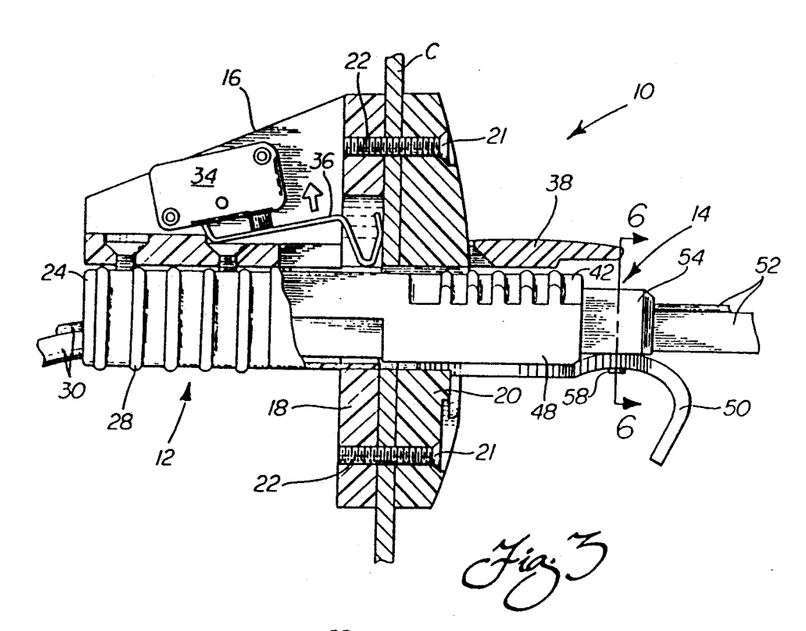
FIG. 5 is a perspective view of the charger plug connector showing the J-shaped handle and charger cable clamping block.
Figure 6:
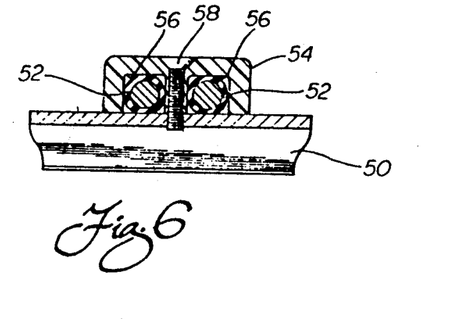
FIG. 6 is a detailed view showing the clamping block securing the charger cables to the handle.

As best shown in FIGS. 1, 5 and 6, the charger plug 14 comprises an electrical connector 42 including a pair of contacts 44 (only one shown in FIG. 2) that are adapted to cooperate with the contacts 26 of the connector 24 of the receptacle 12 to provide an operative connection between the battery charger 46 and the battery 32. This connection is described in greater detail below with reference to drawing FIG. 7.

Like the connector 24, the connector 42 also includes a non-conductive and fire-resistant sleeve 48 over the contacts 44. This sleeve may also be formed from ABS plastic that is twenty percent (20%) glass filled for strength.

The connector plug 14 also includes a handle 50 that is substantially J-shaped in profile. The handle 50 may be grasped with the fingers so as to aid in manipulating the charger plug 14 when connecting and disconnecting from the receptacle 12. Preferably, the handle 14 is fastened to the sleeve 48 of the connector 42 by rivets or screws.

Charger cables 52 from the battery charger 46 are soldered to the ends of the contacts 44. A clamping block 54 secures the cables 52 to the charger plug 14. More particularly, as best shown in FIG. 6, the clamping block 54 includes a pair of grooves 56 through which the individual cables 52 are extended. The block 54 is then tightly fastened to the handle 50 by means of a screw 58 so that the cords are tightly engaged and pinched between the clamping block 54 and the handle. As a result, if the charger cables 52 are grasped and pulled in an effort to remove the charger plug 14 from the receptacle 12, the pulling force is applied at the pinch point between the clamping block 54 and the handle 50 rather than to the solder connection between the electric conductors in the cords 52 and the electrical contacts 44. Hence, the integrity of the solder connection is maintained over time for more reliable and dependable performance.

In contrast, in prior art systems not incorporating the clamping block 54, the pulling force is applied directly to the solder connection. This causes the solder connection to weaken over time. This weakening initially adversely affects the efficiency of the system during the charging operation. Eventually, the connection may sever, preventing charging altogether until repairs are completed. This significant problem is avoided with the utilization of the present invention.

It should also be appreciated that both the handle 50 and clamping block 54 are molded from a non-electrically conductive and heat resistant material such as NORYL N-190 or NORYL N-300 or CYCOLAC thermal plastic resin. Hence, if the insulation around the conductors in the charger cables 52 becomes damaged for any reason in the proximity of the handle 50 and clamping block 54, a short will not develop and no arcing will take place between the conductors and these components. This reduces the shock hazard and also serves to improve battery charging system reliability.

When attempting to connect the charger plug 14 to the charger receptacle 12, the door 38 is pivoted to the open position shown in full line in FIG. 1. The charger plug 14 is then pushed into the underlying opening 60 in the face plate 20. The top, bottom and side walls 61-63 of the opening 60 snugly engage the walls of the sleeve 48 so as to guide and align the connector 42, including contacts 44, of the charger plug 14 with the connector 24, including contacts 26, of the receptacle 12.

As best shown in FIG. 2, just as the charger plug 14 begins to engage with the receptacle 12, the leading edge 64 of the upper wall of the sleeve 42 engages the U-shaped portion of the trip lever 36. Since the trip lever 36 is U-shaped, this engagement forces the trip lever to move upwardly in the direction of action arrow B until normally closed microswitch 36 is opened. As shown in FIG. 2, this condition occurs before mating electrical connection is made between the contacts 44 of the plug connector 14 and the contacts 26 of the receptacle 12. As described in greater detail below when discussing FIG. 7, the opening in the microswitch 34 serves to interrupt the electrical circuit between the battery 32 and the drive motor 66 of the vehicle. Hence, operation of the vehicle drive motor is prevented when charger plug 14 is inserted into the charger receptacle 12.

As shown in FIG. 4, further insertion of the charger plug 14 into the receptacle 12 brings the cooperating contacts 26 and 44 into operational engagement. In this position current from the charger 46 may be directed along the charger cables 52 through the charger plug 14 by means of the contacts 44. This current then passes through the contacts 26 of the charger plug receptacle 12 along the battery leads 30 to the battery 32. Accordingly, in this position it is possible to fully charge the battery 32. Of course, since the sleeve 48 about the charger plug 14 remains engaged against the trip lever 36 to hold the microswitch 34 in the open position, it should also be appreciated that the electrical circuit between the battery 32 and the drive motor 66 remains interrupted during the entire time the charging system 100 is connected to allow charging.

Figure 7:
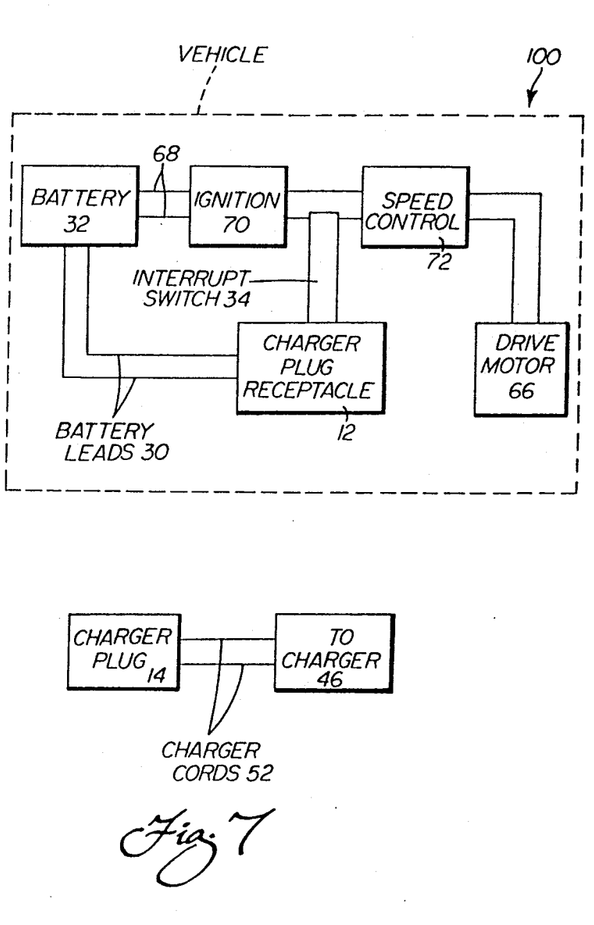
FIG. 7 is a schematic circuit diagram showing the battery charging system of the present invention.

More particularly, as shown in FIG. 7, the power leads 68 from the battery 32 pass through the ignition 70, the microswitch interruption device 34 and the speed control 72 to the drive motor 66. Accordingly, when the microswitch 34 is opened, both the speed control 72 and drive motor 66 are disabled to prevent vehicle operation. This safety feature effectively prevents damage to the charger plug receptacle 12, charger plug 14, charger 46 and charger cables 52 that might otherwise result from the inadvertent operation of the vehicle while connected through the charger plug receptacle and charger plug to the charger. In the past, such operation has been known to lead to serious damage of any of these components and in some cases to physical injury. This problem is substantially avoided utilizing the present invention.

In summary, numerous benefits have been described which result from employing the concepts of the present invention. A charger receptacle 12 is provided including a door 38 that is biased to a closed position so as to cover the electrical contacts 26 held in the receptacle. This safety feature substantially reduces the risk of inadvertent contact with the electrical contacts of the charger plug receptacle 12 on the vehicle. Accordingly, the shock hazard is significantly reduced.

The electrical connection apparatus 10 also incorporates and utilizes plug connectors 24, 42 of known design (e.g. 120 Amp connectors such as available from SMH Co. Olathe, Kans., Model: SY6330G6) having shielded contacts for added safety. The plug connectors fit tightly together and provide operative contact of the highest integrity for maximum efficiency during charging. The tight clearance of the charger plug 14 in the plug receptacle 12 assures alignment of the contacts as well as the leading edge or trip member 64 and trip lever 36. The small clearance also ensures that the plug is inserted and withdrawn in proper alignment thereby significantly reducing the risk of damage to the contacts that might otherwise result. Hence, the reliability and service life of the present apparatus 10 is maximized and down time for repair is significantly reduced.

Additionally, the charger plug 14 incorporates a special locking block 54 that secures the charger cables 52 by tightly pinching them against a manipulative handle 50. Advantageously, this securing mechanism protects the solder points of the charger cables 52 with the contacts 44 from the application of any forces that might weaken the connection over time. For example, individuals in a hurry have often been known to grab the charger cables 52 to pull the charger plug 14 from the receptacle 12. The locking block 54 advantageously prevents this pulling force from reaching the solder connection. The integrity of that connection is thereby maintained over a longer period of time. Accordingly, once again it should be appreciated that the service life and reliability of the present electrical connection apparatus 10 is enhanced.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

We claim:

1. An apparatus for connecting a battery charger to a vehicle including a battery and a drive motor in an electrical circuit, comprising:
   a first connector;
   a cooperating second connector for mating in electrical contact with said first connector;
   means for mounting said first connector on said vehicle; and
   means for interrupting the electrical circuit between said drive motor prior to and during mating of said first and second connectors, said interrupting means including an actuator means on said mounting means for intercepting and engaging said second connector prior to said second connector mating in electrical contact with said first connector.

2. The apparatus set forth in claim 1, further including a door for covering said first connector held in said mounting means when not in mating electrical contact with said second connector.

3. The apparatus set forth in claim 2, further including hinge means for mounting said door to said mounting means.

4. The electrical connection apparatus set forth in claim 3, further including means for biasing said door to a closed position covering said first connector held in said mounting means.

5. An apparatus for connecting a battery charger to a vehicle including a battery and a drive motor in an electrical circuit, comprising:
   a first connector;
   a cooperating second connector for mating in electrical contact with said first connector;
   means for mounting said first connector on said vehicle; and
   means for interrupting the electrical circuit between said battery and said drive motor prior to and during mating of said first and second connectors, said interrupting means including actuator means fully recessed within said mounting means for intercepting and engaging said second connector prior to said second connector mating in electrical contact with said first connector.

6. The apparatus set forth in claim 5, wherein said second connector includes a pair of electrically conductive contacts and a non-electrically conductive trip member that extends outwardly beyond the contacts so as to engage said actuator means before mating contact is made with said first connector.

7. The apparatus set forth in claim 6, further including guide means for aligning said first and second connectors for mating as well as aligning said trip member on said second connector with said actuator means on said first connector.

8. The apparatus set forth in claim 5, wherein said interrupting means is mounted to said mounting means and said actuator means is a trip lever.

9. The apparatus set forth in claim 8, wherein said interrupting means is a microswitch.

10. The apparatus set forth in claim 1, further including handle means on said second connector to aid in manipulation of said second connector.

11. The apparatus set forth in claim 10, further including a pair of flexible electrical conductors, a pair of electrical contacts in said second connector and means for securing said flexible electrical conductors to said second connector that clamps said flexible electrical conductors, thereby substantially preventing application of pulling forces to points of attachment between said contacts and said electrical conductors.

12. The apparatus set forth in claim 11, wherein said securing means is a block including groove means for engaging said electrical conductors.

13. The apparatus set forth in claim 12, wherein said securing means further includes means for mounting to said handle means.

14. A battery charging system for an electric vehicle including a battery and drive motor in an electrical circuit, comprising:
   battery charging means;
   a charger receptacle mounted on said vehicle;
   plug means for operatively connecting said battery charging means to said charger receptacle;
   cooperating electrical contacts in said charger receptacle and said plug means;
   a door pivotally mounted over said charger receptacle for covering said electrical contacts when not in mating electrical contact with electrical contacts of said plug means; and
   means for interrupting the electrical circuit between said battery and said drive motor prior to and during full mating of said plug means and said charger receptacle, said interrupting means including actuator means for intercepting and engaging said plug means prior to said electrical contacts of said plug means mating in electrical contact with said electrical contacts of said charger receptacle.

15. The battery charging system set forth in claim 14, further including means for biasing said door to a closed position covering said electrical contacts of said charger receptacle.

16. The battery charging system set forth in claim 14, wherein said plug means includes a non-electrically conductive trip member that extends outwardly beyond the electrical contacts of said plug means so as to engage said actuator means before mating electrical contact is made with said charger receptacle.

17. The battery charging system set forth in claim 16, wherein said door, when in a closed position, also covers said actuator means so as to protect said actuator means from inadvertent contact and damage.

18. The battery charging system set forth in claim 14, further including (a) a pair of flexible electrical conductors, (b) handle means on said plug means to aid in manipulation, and (c) means for securing said flexible electrical conductors to said plug means that clamps said flexible electrical conductors, thereby substantially preventing application of pulling force to points of attachment between said electrical contacts of said plug means and said electrical conductors.

19. The battery charging system set forth in claim 18, said securing means is a block including groove means for engaging said electrical conductors.

20. The battery charging system set forth in claim 19 wherein said handle means and said block are formed of non-electrically conductive material.

* * * * *

UNITED STATES PATENT AND TRADEMARK OFFICE
CERTIFICATE OF CORRECTION

PATENT NO. : 5,220,268
DATED : June 15, 1993
INVENTOR(S) : Stephen D. Rose et al It is certified that error appears in the above-indentified patent and that said Letters Patent is hereby corrected as shown below:

Claim 1, line 9 (at column 9, line 42), following the word "between", insert --said battery and--.

Signed and Sealed this

Twenty-third Day of August, 1994

Attest:

BRUCE LEHMAN

*Attesting Officer*   *Commissioner of Patents and Trademarks*